3,640,928
STABILIZATION OF SYNTHETIC POLYMERS
Keisuke Murayama, Syoji Morimura, Takao Yoshioka, Katsuaki Matsui, Tomoyuki Kurumada, Ichiro Watanabe, and Noriyuki Ohta, Tokyo, Japan, assignors to Sankyo Company Limited, Tokyo, Japan
No Drawing. Filed June 5, 1969, Ser. No. 830,842
Claims priority, application Japan, June 12, 1968, 43/40,377; Mar. 8, 1969, 44/17,841
Int. Cl. C08f 45/60, 51/60
U.S. Cl. 260—23 XA                                    8 Claims

ABSTRACT OF THE DISCLOSURE

This invention discloses the stabilization of synthetic polymers including a polyolefin, a polyvinyl chloride, a polyvinylidene chloride, a polyurethane and a polyamide against photo- and thermo-deteriorations thereof by incorporating therein a piperidine derivative in a sufficient amount to prevent such deteriorations thereof, usually in an amount of 0.01 to 5.0% by weight based on the amount of the synthetic polymer.

---

This invention relates to the stabilization of synthetic polymers. More particularly it relates to the stabilization of synthetic polymers against photo- and thermo-deterioration by incorporating therein, in a sufficient amount to prevent such deterioration, a piperidine derivative having the general formula

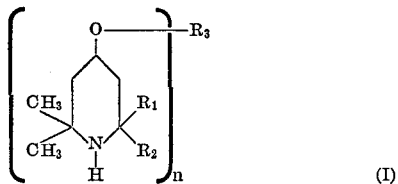

or a salt thereof.

In the above Formula I:
$R_1$ and $R_2$, which may be the same or different, each are an alkyl group such as methyl, ethyl, isopropyl or dodecyl, or they form, together with the carbon atom to which they are attached, a saturated alicyclic group such as

or a group of the formula

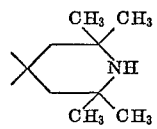

$n$ is an integer of 1 to 3 inclusive; and

When $n$ is 1, $R_3$ is an acyl group derived from an aliphatic, alicyclic or heterocyclic monocarboxylic acid; an N-substituted carbamoyl group derived from an N-substituted carbamic acid; an N-substituted thiocarbomoyl group derived from an N-substituted thiocarbamic acid; a monovalent group obtained by removing a hydroxyl group from an oxoacid; an alkyl group; a cycloalkyl group; an aralkyl group; an aryl group; or a group of the general formula

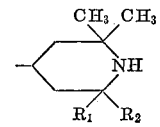

(wherein $R_1$ and $R_2$ are as defined above);

When $n$ is 2, $R_3$ is a diacyl group derived from an aliphatic, alicyclic, aromatic or heterocyclic dicarboxylic acid; a diacarbamoyl group derived from dicarbamic acid; a bisthiocarbamoyl group derived from bisthiocarbamic acid; a carbonyl group; a divalent group obtained by removing two hydroxyl groups from an oxacid; an alkylene group; an arylene group; or an arylenedialkylene group; and When $n$ is 3, $R_3$ is a triacyl group derived from an aliphatic, alicyclic, aromatic or heterocyclic tricarboxylic acid; a tricarbamoyl group derived from tricarbamic acid; a tristhiocarbamoyl group derived from tristhiocarbamic acid; a trivalent group obtained by removing three hydroxyl groups derived from an oxacid; an alkanetriyl group; arenetriyl group; or an arenetriyltrialkylene group.

In the above Formula I, the group $R_3$ can be illustrated as follows:

When $n$ is 1, the $R_3$ may be acetyl, propionyl, butyryl, stearoyl, acryloyl, benzoyl, phenoxyacetyl, cyclohexanoyl, o-, m- or p-chlorobenzoyl, o-, m- or p-toluuyl, isonicotinoyl, furoyl or α-naphthoyl; ethylcarbamoyl, n-butylcarbamoyl, cyclohexylcarbamoyl, phenylcarbamoyl, o-, m- or p-chlorophenylcarbamoyl, o-, m- or p-tolylcarbamoyl or α-naphthylcarbamoyl; ethylthiocarbamoyl, n-butylthiocarbamoyl, cyclohexylthiocarbamoyl or phenylthiocarbamoyl; methyl, ethyl, n-butyl, octyl or stearyl; cyclopentyl, cyclohexyl or cycloheptyl; benzyl or phenethyl; phenyl, o-, m- or p-chlorophenyl, o-, m- or p-tolyl or naphthyl; and 2,2,6,6-tetramethyl-4-piperidyl. And, as an oxoacid which provides a monovalent group, this may be illustrated by an unsubstituted or substituted sulfinic acid, e.g. benzenesulfinic acid; an unsubstituted or substituted sulfonic acid, e.g. benezenesulfonic acid or p-toluenesulfonic acid, p-n-dodecyl-benzenesulfonic acid, methanesulfonic acid; an unsubstituted or substituted phosphorus containing acid e.g. phosphorous acid; or an unsubstituted or substituted boric acid e.g. boric acid.

When $n$ is 2, the $R_3$ may be carbonyl, oxalyl, malonyl, adipyl, fumaryl, hexahydroterephthalyl or terephthalyl; methylene, ethylene, propylene or hexamethylene; p-phenylene or p-xylene; and tolylene-2,4-dicarbamoyl, hexamethylene-1,6-dicarbamoyl, diphenylmethane-p,p'-dicarbamoyl or diphenylether-p,p'-dicarbomyl. And, as an oxacid which provides a divalent group, this may be illustrated by a disulfonic acid, e.g. benzene-1,3-disulfonic acid, a phosphorus-containing acid, e.g. phenylphospho acid, a boric acid, e. g. boric acid.

When $n$ is 3, the $R_3$ may be benzene-1,3,5-tricarbonyl, benzene-1,3,4 - tricarbonyl, cyclohexane-1,3,5-tricarbonyl, or furane-2,3,4-tricarbonyl; benzene-1,3,5-tricarbamoyl or benzene-1,3,4-tristhiocarbamoyl; propane-1,2,3-yl or hexane-1,3,6-yl; benzene-1,3,5-yl; and benzene-1,3,5-triethylene. And, as an oxacid which provides a trivalent group, there may be illustrated by a trisulfonic acid, e.g. benzene-1,3,5-trisulfonic acid, a phosphorus-containing acid, e.g. phosphoric acid or phospho acid, a boric acid, e.g. boric acid.

Also, this invention is concerned with the synthetic polymer composition thus stabilized.

The term "synthetic polymer" as used herein are intended to embrace:

Polyolefins including: homopolymers of olefins such as low-density polyethylene, high-density polyethylene, polypropylene, polystyrene, polybutadiene, polyisoprene and the like, and copolymers of olefins with other ethylenically unsaturated monomers such as ethylene-propylene copolymer, ethylenebutene copolymer, ethylene-vinyl acetate copolymer, styrene-butadiene copolymer, acrylonitrile-styrene-butadiene copolymer and the like;

Polyvinyl chlorides and polyvinylidene chlorides including: homopolymer of each of vinyl chloride and vinylidene chloride, vinyl chloride-vinylidene chloride copolymer and copolymers of each of vinyl chloride and vinylidene chloride with vinyl acetate or other ethylenically unsaturated monomers; polyamides; and polyurethanes.

The polyvinyl chlorides and polyvinylidene chlorides may also be blended with other synthetic polymers to form the compositions.

Polyurethane elastomers to be employed in the present invention may be prepared, for example, by the following method. A relatively low molecular weight polymer having terminal active hydrogen atoms, for example polyether or polyester, is reacted with an organic polyisocyanate and a chain propagator having two or more active hydrogen atoms, for example, diamine, glycol or water, in the presence or absence of a solvent in a single- or multi-stage reaction to produce a high molecular weight polyurethane elastomer. Such method is disclosed in, for example, Japanese patent publications Nos. 2994/1959, 22682/1964, 488/1966 and 13626/1967.

The polyamide may be any of conventionally used polyamides or a blend thereof.

These synthetic polymers have been widely used, in view of their excellent properties, in various forms or shapes, for example, filament, fibre, yarn, film, sheet, other molded article, latex and foam. On the other hand, however, these polymers have drawbacks such as poor light- and heat-stabilities. Stated illustratively, polyolefins and polyurethane elastomers frequently tend to undergo severe deterioration when exposed to light such as sunlight or ultraviolet, and polyvinyl chloride and polyvinylidene chloride frequently tend to deteriorate and become colored by the action of light and heat with elimination of hydrogen chloride therefrom. Polyamides also are frequently subjected to photo-deterioration. For the purpose of stabilizing these synthetic polymers against such deterioration, a number of stabilizers have heretofore been proposed in the art; for example, for polyolefins, benzotriazole compounds and benzophenone compounds; for polyurethanes, phenol compounds and benzophenone compounds; and for polyvinyl chloride and polyvinylidene chloride, lead salts, such as basic lead silicate and tribasic lead maleate, and organotin compounds, such as dibutyltin laurate and dibutyltin maleate. These prior art stabilizers are, however, not entirely satisfactory.

Thus, the developments of the more effective stabilizers are desired as an improvement in the art.

As a result of our extensive investigations, it has been unexpectedly found that the piperidine derivatives (I) and salts thereof of the present invention exhibit a high degree of stabilizing action on polyolefins, polyvinyl chloride, polyvinylidene chloride, polyamides and polyurethanes against the deteriorations mentioned above.

The piperidine derivatives (I) and salts thereof of the present invention are stabilizers of a new type differing in structure from those of the conventional stabilizers. Thus, the present piperidine derivatives and salts thereof have the following characteristics:

(1) They show a high degree of stabilizing action, as compared with the prior art stabilizers, on the synthetic polymers against the photo-deterioration thereof, (2) They show no appreciable degree of coloring action on the synthetic polymers including polyolefins, polyvinyl chloride, polyvinylidene chloride, polyurethanes and polyamides and can be used together with plasticisers and other known stabilizers, without coloring of the synthetic polymers to be stabilized or reduction in their stabilizing ability.

(3) They show little thermal sublimation and exudation, and (4) They exhibit excellent stabilizing action against thermo-deterioration as well as photo-deterioration, although the prior art stabilizers exhibit little or even negative stabilizing action against thermo-deterioration.

Representative examples of the piperidine derivatives (I) and the salts thereof employed in this invention are listed hereinbelow. It is, however, to be understood that the present invention is not limited to those illustrated compounds.

(1) 4-acetoxy-2,2,6,6-tetramethylpiperidine;
(2) 4-stearoyloxy-2,2,6,6-tetramethylpiperidine;
(3) 4-acryloyloxy-2,2,6,6-tetramethylpiperidine;
(4) 4-(phenylacetoxy)-2,2,6,6-tetramethylpiperidine;
(5) 4-(phenoxyacetoxy)-2,2,6,6-tetramethylpiperidine;
(6) 4-cyclohexanoyloxy-2,2,6,6-tetramethylpiperidine;
(7) 4-benzoyloxy-2,2,6,6-tetramethylpiperidine;
(8) 4-(p-chlorobenzoyloxy)-2,2,6,6-tetramethylpiperidine;
(9) 4-(m-chlorobenzoyloxy)-2,2,6,6-tetramethylpiperidine;
(10) 4-(o-chlorobenzoyloxy)-2,2,6,6-tetramethylpiperidine;
(11) 4-(o-toluoyloxy)-2,2,6,6-tetramethylpiperidine;
(12) 4-isonicotinoyloxy-2,2,6,6-tetramethylpiperidine;
(13) 4-(2-furoyloxy)-2,2,6,6-tetramethylpiperidine;
(14) 4-(β-naphthoyloxy)-2,2,6,6-tetramethylpiperidine;
(15) 4-methoxy-2,2,6,6-tetramethylpiperidine;
(16) 4-stearyloxy-2,2,6,6-tetramethylpiperidine;
(17) 4-cyclohexyloxy-2,2,6,6-tetramethylpiperidine;
(18) 4-benzyloxy-2,2,6,6-tetramethylpiperidine;
(19) 4-phenoxy-2,2,6,6-tetramethylpiperidine;
(20) 4-(ethylcarbamoyloxy)-2,2,6,6-tetramethylpiperidine;
(21) 4-(cyclohexylcarbamoyloxy)-2,2,6,6-tetramethylpiperidine;
(22) 4-(phenylcarbamoyloxy)-2,2,6,6-tetramethylpiperidine;
(23) 4-(p-chlorophenylcarbamoyloxy)-2,2,6,6-tetramethylpiperidine;
(24) 4-(o-tolylcarbamoyloxy)-2,2,6,6-tetramethylpiperidine;
(25) 4-(α-naphthylcarbamoyloxy)-2,2,6,6-tetramethylpiperidine;
(26) 4-(ethylthiocarbamoyloxy)-2,2,6,6-tetramethylpiperidine;
(27) 4-(cyclohexylthiocarbamoyloxy)-2,2,6,6-tetramethylpiperidine;
(28) 4-(phenylthiocarbamoyloxy)-2,2,6,6-tetramethylpiperidine;
(29) 4-benzensulfinyloxy-2,2,6,6-tetramethylpiperidine;
(30) 4-benzenesulfonyloxy-2,2,6,6-tetramethylpiperidine;
(31) 4-(p-toluensulfonyloxy)-2,2,6,6-tetramethylpiperidine;
(32) 4-(p-n-dodecylbenzenesulfonyloxy)-2,2,6,6-tetramethylpiperidine;
(33) 4-methanesulfonyloxy-2,2,6,6-tetramethylpiperidine;
(34) bis(2,2,6,6-tetramethyl-4-piperidyl)carbonate;
(35) bis(2,2,6,6-tetramethyl-4-piperidyl)oxalate;
(36) bis(2,2,6,6-tetramethyl-4-piperidyl) malonate;
(37) bis(2,2,6,6-tetramethyl-4-piperidyl) adipate;
(38) bis(2,2,6,6-tetramethyl-4-piperidyl) fumarate;
(39) bis(2,2,6,6-tetramethyl-4-piperidyl( hexahydroterephthalate;
(40) bis(2,2,6,6-tetramethyl-4-piperidyl) terephthalate;

(41) 1,2-bis(2,2,6,6-tetramethyl-4-piperidyloxy) ethane;
(42) α,α'-bis(2,2,6,6-tetramethyl-4-piperidyloxy) p-xylene;
(43) bis(2,2,6,6-tetramethyl-4-piperidyl) tolylene-2,4-dicarbamate;
(44) bis(2,2,6,6-tetramethyl-4-piperidyl) hexamethylene-1,6-dicarbamate;
(45) bis(2,2,6,6-tetramethyl-4-piperidyl) diphenylmethane-p,p'-dicarbamate;
(46) bis(2,2,6,6-tetramethyl-4-piperidyl) diphenylether-p,p'-dicarbamate
(47) bis(2,2,6,6-tetramethyl-4-piperidyl) benzene-1,3-disulfonate;
(48) bis(2,2,6,6-tetramethyl-4-piperidyl) phenylphosphite;
(49) tris(2,2,6,6-tetramethyl-4-piperidyl) phosphite;
(50) tris(2,2,6,6-tetramethyl-4-piperidyl) phosphate;
(51) 6-aza-7,7-dimethyl-9-benzoyloxy-spiro[4,5] decane;
(52) 1-aza-2,2-dimethyl-4-benzoyloxy-spiro[5,5] undecane;
(53) 1,9-diaza-4-benzoyloxy-2,2,8,8,10,10-hexamethyl-spiro[5,5] undecane;
(54) 1,9-diaza-4-(cyclohexylcarbamoyloxy)-2,2,8,8,10,10-hexamethyl-spiro[5,5] undecane;
(55) bis(2,2,6,6-tetramethyl-4-piperidyl) ether;
(56) tris(2,2,6,6-tetramethyl-4-piperidyl)-benzene-1,3,5-tricarboxylate; and
(57) tris(2,2,6,6-tetramethyl-4-piperidyl)-benzene-1,3,4-tricarboxylate.

As explained hereinabove, the salts of the piperidine derivatives (I) are also contemplated to be included within the purview of the present invention. Examples of the salts of the piperidine derivatives (I) which may be employed in the present invention include inorganic acid salts such as phosphate, carbonate and the like; as well as organic acid salts such as citrate, stearate, benzoate, and the like.

The piperidine compounds of the Formula I may readily and advantageously be prepared by known methods, for example, by reacting a 4-hydroxy-piperidine compound represented by the formula

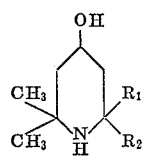

wherein $R_1$ and $R_2$ are as defined above with a chloride such as acyl chloride, oxoacid chloride or alkyl chloride, with an isocyanate or with an isothiocyanate to form the corresponding desired compound.

The above-mentioned synthetic polymers may be any shape or form and may, for example, be in the form of a powder, filament, fibre, film, foam, sheet or other shaped article.

The piperidine derivatives (I) or salts thereof employed as stabilizers in the present invention may be readily incorporated into the synthetic polymers by various standard procedures commonly utilized in the art. The stabilizers may be incorporated into the synthetic polymers at any desired stage prior to the manufacture of shaped articles therefrom. Thus, for example, the dry stabilizer in the form of a powder may be mixed with the synthetic polymer, or a suspension or emulsion of the stabilizer may be mixed with a suspension or emulsion of the synthetic polymer.

The amount of the piperidine derivatives (I) or salts thereof employed in the synthetic polymer in accordance with the present invention may vary widely depending upon the type, properties and particular uses of the synthetic polymer to be stabilized. In general, the piperidine derivatives of the Formula I or salts thereof may be added in an amount ranging from 0.01 to 5.0% by weight, based on the amount of the synthetic polymer, but the practical range is varied depending upon the type of the synthetic polymer, that is 0.01 to 2.0% by weight, preferably 0.02 to 1.0% by weight for polyolefins, 0.01 to 1.0% by weight preferably 0.02 to 0.5% by weight for polyvinyl chloride and polyvinylidene chloride, and 0.01 to 5.0% by weight, preferably 0.02 to 2.0% by weight for polyurethanes and polyamides.

The present stabilizers may be used alone or in combination with other known stabilizers, fillers, pigments and the like.

If desired, two or more of the present stabilizers i.e. the piperidine derivatives of the Formula I and salts thereof may also be satisfactorily used in admixture.

In order that the invention may be better understood the following examples are given by way of illustration only. In the examples, all parts are given by weight unless otherwise indicated. The numbers of the stabilizers used in the examples correspond to those of the foregoing listed compounds.

EXAMPLE 1

100 parts of polypropylene were admixed, with melting, with 0.25 part of a stabilizer of this invention as specified in the following Table 1. The resulting mixture was molded into a sheet with a thickness of 0.5 mm. under heating and pressure.

As a control, the polypropylene sheet was prepared in a similar manner to that described above with the conventionally known stabilizer, "Tinuvin P" (registered trademark) for comparative purpose.

Then, all of these sheets thus formed were tested for the brittleness time (which means the time, expressed in terms of hour, until the test sheet will become brittle) under ultraviolet irradiation at a temperature of 45° C. by means of the fade meter prescribed in Japanese Industrial Standard JIS–L–1044 entitled "Testing Method of Color Fastness to Light of Dyed Textiles and Dyestuffs." The apparatus used is described in paragraph 3.8 of this publication, which is in the English language.

The test results are listed in the following Table 1.

TABLE 1

Stabilizer:

| Compounds— | Brittleness time (hrs). |
|---|---|
| 1 | 580 |
| 2 | 700 |
| 3 | 600 |
| 7 | 620 |
| 8 | 760 |
| 15 | 300 |
| 18 | 560 |
| 20 | 800 |
| 21 | 480 |
| 22 | 440 |
| 24 | 760 |
| 28 | 360 |
| 31 | 380 |
| 37 | 840 |
| 40 | 520 |
| 41 | 320 |
| 43 | 800 |
| 45 | 580 |
| 49 | 600 |
| 53 | 660 |
| Tinuvin P | 80 |
| None | 40 |

EXAMPLE 2

100 parts of high-density polyethylene obtained by low pressure polymerization were admixed, with melting, with 0.25 part of a stabilizer as specified in the following Table 2. The resulting mixture was molded into a sheet with a thickness of 0.5 mm. under heating and pressure.

Then, the test was conducted in the same manner as described in Example 1. The test results are summarized in the following Table 2.

TABLE 2

| Stabilizer: Compounds— | Brittleness time (hrs.) |
|---|---|
| 1 | 920 |
| 7 | 1080 |
| 8 | 1220 |
| 15 | 880 |
| 18 | 1100 |
| 22 | 1060 |
| 28 | 960 |
| 31 | 900 |
| 37 | 1340 |
| 40 | 1100 |
| 41 | 840 |
| 43 | 1080 |
| 45 | 1020 |
| 49 | 1140 |
| 53 | 1180 |
| Tinuvin P | 420 |
| None | 300 |

EXAMPLE 3

100 parts of polysytrene were admixed, with melting, with 0.2 part of a stabilizer as specified in the following Table 3. The resulting mixture was molded into a film with a thickness of about 0.1 mm. under heating and pressure. The film was exposed to ultraviolet light for 33 hours in the fade meter as described in Example 1. Before and after the exposure, the infrared absorption spectra of the film were measured by a conventional means. Then the degree of increase in absorbance at 1720 cm.$^{-1}$ was calculated by substracting the absorbance after exposure from that before exposure.

The results are shown in the following Table 3.

TABLE 3

| Stabilizer: Compounds— | Increase in absorbance at 1720 cm.$^{-1}$ |
|---|---|
| 1 | 6 |
| 7 | 4 |
| 8 | 3 |
| 15 | 8 |
| 22 | 7 |
| 28 | 8 |
| 31 | 8 |
| 37 | 5 |
| 45 | 3 |
| 49 | 4 |
| 53 | 6 |
| Tinuvin P | 9 |
| None | 32 |

EXAMPLE 4

100 parts of a commercially available acrylonitrile-butadiene-styrene copolymer were admixed with melting, with 0.5 part of a stabilizer as specified in the following Table 4. The resulting mixture was molded into a sheet with a thickness of 0.5 mm. under heating and pressure. Then, the sheet was exposed to artificial weather for 50 hours by means of the weather meter with sunshine carbon as prescribed in the JIS–Z–0230 to measure the tensile strength retention. The results are shown in the following Table 4.

TABLE 4

| Stabilizer | Elongation retention (percent) | Tensile strength retention (percent) |
|---|---|---|
| Compound: | | |
| 1 | 59 | 68 |
| 7 | 63 | 76 |
| 8 | 66 | 78 |
| 15 | 58 | 64 |
| 22 | 62 | 74 |
| 28 | 57 | 68 |
| 31 | 64 | 70 |
| 37 | 70 | 73 |
| 45 | 72 | 78 |
| 49 | 70 | 76 |
| 53 | 62 | 70 |
| Tinuvin P | 54 | 55 |
| None | 45 | 53 |

EXAMPLE 5

100 parts of polyvinyl chloride were intimately admixed with 1 part of lead stearate, 0.5 part of dibasic lead stearate, 0.5 part of barium stearate, 0.5 part of cadmium stearate and 0.05 part of stabilizer of this invention as specified in the following Table 5. The resulting powder mixture was molded by rolling at 170° C. for 5 minutes into a sheet 0.5 mm. thick. In order to test the heat stability of the sheet prepared above, the sheet was heated in Geer's oven at 175° C. and the time until the sheet became colored and deteriorated was measured. The results are summarized in the following Table 5.

TABLE 5

| Stabilizer | Time (minutes) | | | |
|---|---|---|---|---|
| | 20 | 40 | 60 | 80 |
| Compound: | | | | |
| 1 | Colorless | Pale yellow | Yellow | Yellow. |
| 2 | do | do | do | Do. |
| 7 | do | do | do | Do. |
| 18 | do | do | do | Do. |
| 22 | do | do | do | Brown. |
| 28 | do | do | do | Do. |
| 31 | do | do | do | Do. |
| 40 | do | do | do | Yellow. |
| 45 | do | do | do | Do. |
| 49 | do | do | do | Do. |
| None | Pale yellow | Brown | Black | Black. |

In order to test the stability to light of the sheet, it was pressed at 180° C. under a pressure of 100 kg./cm.$^2$ for 5 minutes and then exposed to ultraviolet light by means of the weather meter with sunshine carbon as described in Example 4. The time until the sheets became colored and deteriorated was measured. The results are summarized in the following Table 6.

TABLE 6

| Stabilizer | Time (hours) | | |
|---|---|---|---|
| | 300 | 600 | 900 |
| Compound: | | | |
| 1 | Colorless | Colorless | Pale brown. |
| 2 | do | do | Do. |
| 7 | do | do | Do. |
| 18 | do | do | Do. |
| 22 | do | do | Do. |
| 28 | do | do | Do. |
| 31 | do | do | Do. |
| 40 | do | do | Do. |
| 45 | do | do | Do. |
| 49 | do | do | Do. |
| None | Pale brown | Brown | Dark brown. |

EXAMPLE 6

100 parts of polyvinylidene chloride resin were intimately admixed with 7 parts of dioctyl phthalate and 0.25 part of a stabilizer of this invention as specified in the following Table 7. The resulting mixture was molded into a sheet with a thickness of about 2 mm. at 160° C. under pressure by means of a molding machine. In order to test the stability to light, the test piece of this sheet was exposed to ultraviolet light for various periods of time by means of the fade meter as described in Example 1. The results with regard to coloration are shown in the following Table 7.

In order to test the heat stability, the other test piece prepared in the same manner as above was heated in Geer's oven at 150° C. and the change of color in a given period of time was examined. The results are given in the following Table 8.

As is apparent from Tables 7 and 8, it takes a long time until the polyvinylidene chloride resin in which the stabilizer of this invention is incorporated becomes colored and deteriorated, and the excellent stabilizing activity of the present stabilizers is proved.

TABLE 7

| Stabilizer | Time (hours) | |
|---|---|---|
| | 60 | 100 |
| Compound: | | |
| 7 | Yellow | Brown. |
| 40 | Pale yellow | Pale brown. |
| None | Brown | Dark brown. |

TABLE 8

| Stabilizer | Time (minutes) at 150° C. | |
|---|---|---|
| | 60 | 70 |
| Compound: | | |
| 7 | Light brown | Dark brown. |
| 40 | Pale brown | Brown. |
| None | Black | Black. |

EXAMPLE 7

To 100 parts of a commercially available polyurethane resin synthesized from polycaprolactone (which resin E–5080 is manufactured and sold by Nihon Elastran Kabushiki Kaisha and in which no stabilizer is incorporated) 0.5 part of stabilizer of this invention was added as specified in the following Table 9. The resulting mixture was molded into an elastic sheet with a thickness of about 0.5 mm. at 165° C. by means of an extruder. The sheet thus obtained was exposed to ultraviolet light for 15 hours by means of the fade meter as described in Example 1 and subsequently subjected to the stretching test to obtain the retentions of strength and elongation. The results are summarized in the following Table 9.

As is apparent from Table 9, the elastic sheet in which the stabilizer of this invention is incorporated has good properties, and the remarkable stabilizing activity of the present stabilizers is proved.

TABLE 9

| Stabilizer | Added amount (percent by weight) | Strength retention (percent) | Elongation retention (percent) |
|---|---|---|---|
| Compound: | | | |
| 1 | 0.5 | 79 | 97 |
| 2 | 0.5 | 84 | 97 |
| 7 | 0.5 | 88 | 96 |
| 8 | 0.5 | 76 | 88 |
| 15 | 0.5 | 70 | 81 |
| 20 | 0.5 | 75 | 90 |
| 21 | 0.5 | 77 | 89 |
| 22 | 0.5 | 80 | 90 |
| 26 | 0.5 | 73 | 87 |
| 30 | 0.5 | 70 | 80 |
| 40 | 0.5 | 75 | 90 |
| 43 | 0.5 | 69 | 80 |
| 44 | 0.5 | 72 | 86 |
| 45 | 0.5 | 70 | 80 |
| 46 | 0.5 | 73 | 88 |
| 49 | 0.5 | 80 | 92 |
| None | | 45 | 68 |

EXAMPLE 8

500 parts of polycaprolactone glycol having an average molecular weight of 1,000 were reacted, while stirring, with 44 parts of 2,4-tolylenediisocyanate at 90° C. for 1 hour in a nitrogen stream to obtain a prepolymer having terminal hydroxyl groups and an average molecular weight of 2,140. Subsequently, 100 parts of the prepolymer were dissolved in 330 parts of dry dimethylformamide to form a uniform solution. To the solution were added dropwise, while stirring, 23.4 parts of 4,4'-diphenylmethanediisocyanate at room temperature under a nitrogen stream, whereupon the resulting mixture was stirred at 85° C. for 40 minutes to complete the reaction. The resulting mixture thus obtained was a dimethylformamide solution of the polymer having terminal isocyanate groups. To this solution were added dropwise, while stirring, 20 parts of dimethylformamide containing 0.1 part of water at room temperature to form a uniform solution. To the resulting solution was added a solution of an indicated amount of a stabilizer of this invention in 20 parts of dry dimethylformamide, followed by sufficient stirring. After degassing, the resulting solution was extruded into warm water heated to 70 to 80° C. by means of an injection tube having an internal diameter of 0.2 mm. and having a length of 2 m. to form an elastic yarn. The elastic yarn thus obtained was immersed in hot water heated to 90 to 100° C. for 30 minutes, thereby yielding an elastic yarn having a strength of 2.5 g./d. and an elongation of 500%.

The polyurethane elastic yarn thus prepared was exposed to ultraviolet irradiataion for 15 hours by means of the fade meter as described in Example 1, whereupon the strength and elongation were examined. The results are shown in the following Table 10.

As is apparent from Table 10, the elastic yarn in which the stabilizer is incorporated has excellent stability to light, and thus the remarkably excellent light stabilizing activity of the present stabilizers is proved.

TABLE 10

| Stabilizer | Added amount (percent by weight) | Strength retention (percent) | Elongation retention (percent) |
|---|---|---|---|
| Compound: | | | |
| 1 | 1 | 73 | 95 |
| 2 | 1 | 71 | 91 |
| 7 | 1 | 70 | 92 |
| None | | 39 | 75 |

EXAMPLE 9

100 parts of 6-nylon resin were added 0.25 part of a stabilizer of this invention as specified in the following Table 11. The resulting mixture was molded into a film with a thickness of about 0.1 mm. under heating and pressure by means of a molding machine. The test piece of the film was exposed to ultraviolet irradiation for 300 hours by means of the weather meter as described in Example 4, whereupon the retentions of tensile strength and elongation were measured. The results are shown in the following Table 11.

In order to test the heat stability, the other test piece prepared in the same manner as above was heated in Geer's oven at 140° C. for 8 days, whereupon the retentions of tensile strength and elongation were measured. The results are shown in the following Table 12.

As is apparent from Tables 11 and 12, the test piece in which the stabilizer of this invention is incorporated has excellent weather and heat stabilities, and the excellent stabilizing activity of the present stabilizers is proved.

TABLE 11

| Stabilizer | Tensile strength retention (percent) | Elongation retention (percent) |
|---|---|---|
| Compound: | | |
| 1 | 78 | 65 |
| 7 | 85 | 80 |
| None | 60 | 13 |

TABLE 12

| Stabilizer | Tensile strength retention (percent) | Elongation retention (percent) |
|---|---|---|
| Compound: | | |
| 1 | 60 | 55 |
| 7 | 65 | 59 |
| None | 35 | 30 |

What is claimed is:

1. A synthetic polymer composition stabilized against photo- and thermo-deteriorations, said synthetic polymer being a polyolefin, polyvinyl chloride, polyvinylidene chloride, polyamide or polyurethane, wherein there is incorporated, in a sufficient amount to inhibit deteriorations thereof, a piperidine derivative having the general formula

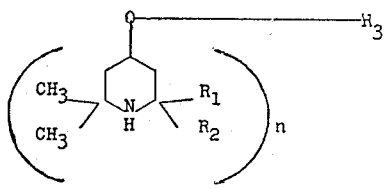

wherein $R_1$ and $R_2$, which may be the same or different, each are an alkyl group, or they form, together with the carbon atom to which they are attached, a saturated alicyclic group with 5 to 7 ring carbon atoms or a group of the formula:

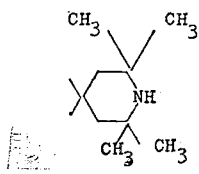

$n$ is an integer of 1 to 3 inclusive; and
when $n$ is 1, $R_3$ is an acyl group, an N-substituted carbamoyl group having as a substituent alkyl, cycloalkyl or aryl, an N-monosubstituted thiocarbamoyl group having as a substituent alkyl, cycloalkyl or aryl, a monovalent group obtained by removing a hydroxyl group from a sulfinic acid, a sulfonic acid, a phosphorus-containing acid or a boric acid, an alkyl group, a cycloalkyl group, an aralkyl group, an aryl group or a group of the general formula

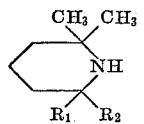

(wherein $R_1$ and $R_2$ are as defined above)
when $n$ is 2, $R_3$ is a diacyl group, derived from a dibasic aliphatic or aromatic carboxylic acid, a dicarbamoyl group in which two carbamoyl groups are combined by interruption of aryl, alkyl, diarylalkane or diaryl ether, a carbonyl group, a divalent group obtained by removing two hydroxyl groups from a disulfonic acid, a phosphorus-containing acid or a boric acid, an alkylene group, an arylene group or arylene dialkylene group, and
when $n$ is 3, $R_3$ is a triacyl group derived from an aromatic, cycloaliphatic or furane tricarboxylic acid, a tricarbamoyl group in which three carbamoyl groups are attached to one aryl group, a trivalent group obtained by removing three hydroxyl groups from a trisulfonic acid, a phosphorus-containing acid or a boric acid, alkanetriyl, an arenetriyl group or an arenetriyltrialkylene group;
or a salt thereof with phosphoric acid, carbonic acid, citric acid, stearic acid or benzoic acid.

2. A synthetic polymer composition as claimed in claim 1, wherein said polymer is a polyolefin.

3. A synthetic polymer composition as claimed in claim 1, wherein said polymer is a polyvinyl chloride.

4. A synthetic polymer composition as claimed in claim 1, wherein said polymer is a polyvinylidene chloride.

5. A synthetic polymer composition as claimed in claim 1, wherein said polymer is a polyurethane.

6. A synthetic polymer composition as claimed in claim 1, wherein said piperidine derivative is incorporated in an amount of 0.01 to 5.0% by weight, based on the amount of the synthetic polymer.

7. A synthetic polymer composition as claimed in claim 1, wherein said piperidine derivative is selected from the group consisting of
4-acetoxy-2,2,6,6-tetramethylpiperidine;
4-stearoyloxy-2,2,6,6-tetramethylpiperidine;
4-acryloyloxy-2,2,6,6-tetramethylpiperidine;
4-(phenylacetoxy)-2,2,6,6-tetramethylpiperidine;
4-(phenoxyacetoxy)-2,2,6,6-tetramethylpiperidine;
4-cyclohexanoyloxy-2,2,6,6-tetramethylpiperidine;
4-benzoyloxy-2,2,6,6-tetramethylpiperidine;
4-(p-chlorobenzoyloxy)-2,2,6,6-tetramethylpiperidine;
4-(m-chlorobenzoyloxy)-2,2,6,6-tetramethylpiperidine;
4-(o-chlorobenzoyloxy)-2,2,6,6-tetramethylpiperidine;
4-(o-toluoyloxy)-2,2,6,6-tetramethylpiperidine;
4-isonicotinoyloxy-2,2,6,6-tetramethylpiperidine;
4-(2-furoyloxy)-2,2,6,6-tetramethylpiperidine;
4-($\beta$-naphthoyloxy)-2,2,6,6-tetramethylpiperidine;
4-methoxy-2,2,6,6-tetramethylpiperidine;
4-stearyloxy-2,2,6,6-tetramethylpiperidine;
4-cyclohexyloxy-2,2,6,6-tetramethylpiperidine;
4-benzyloxy-2,2,6,6-tetramethylpiperidine;
4-phenoxy-2,2,6,6-tetramethylpiperidine;
4-(ethylcarbamoyloxy)-2,2,6,6-tetramethylpiperidine;
4-(cyclohexylcarbamoyloxy)-2,2,6,6-tetramethylpiperidine;
4-(phenylcarbamoyloxy)-2,2,6,6-tetramethylpiperidine;
4-(p-chlorophenylcarbamoyloxy)-2,2,6,6-tetramethylpiperidine;
4-(o-tolylcarbamoyloxy)-2,2,6,6-tetramethylpiperidine;
4-($\alpha$-naphthylcarbamoyloxy)-2,2,6,6-tetramethylpiperidine;
4-(ethylthiocarbamoyloxy)-2,2,6,6-tetramethylpiperidine;
4-(cyclohexylthiocarbamoyloxy)-2,2,6,6-tetramethylpiperidine;
4-(phenylthiocarbamoyloxy)-2,2,6,6-tetramethylpiperidine;
4-benzenesulfinyloxy-2,2,6,6-tetramethylpiperidine;
4-benzenesulfonyloxy-2,2,6,6-tetramethylpiperidine;
4-(p-toluenesulfonyloxy)-2,2,6,6-tetramethylpiperidine;
4-(p-n-dodecylbenzenesulfonyloxy)-2,2,6,6-tetramethylpiperidine;
4-methanesulfonyloxy-2,2,6,6-tetramethylpiperidine;
bis(2,2,6,6-tetramethyl-4-piperidyl) carbonate;
bis(2,2,6,6-tetramethyl-4-piperidyl) oxalate;
bis(2,2,6,6-tetramethyl-4-piperidyl) malonate;
bis(2,2,6,6-tetramethyl-4-piperidyl) adipate;
bis(2,2,6,6-tetramethyl-4-piperidyl) fumarate;
bis(2,2,6,6-tetramethyl-4-piperidyl) hexahydroterephthalate;
bis(2,2,6,6-tetramethyl-4-piperidyl) terephthalate;
1,2-bis(2,2,6,6-tetramethyl-4-piperidyloxy)ethane;
$\alpha,\alpha'$-bis(2,2,6,6-tetramethyl-4-piperidyloxy) p-xylene;
bis(2,2,6,6-tetramethyl-4-piperidyl)-tolylene-2,4-dicarbamate;
bis(2,2,6,6-tetramethyl-4-piperidyl)-hexamethylene-1,6-dicarbamate;

bis(2,2,6,6-tetramethyl-4-piperidyl)diphenyl-
 methane-p,p'-dicarbamate;
bis(2,2,6,6-tetramethyl-4-piperidyl)diphenylether-
 p,p'-dicarbamate;
bis(2,2,6,6-tetramethyl-4-piperidyl)benzene-1,3-
 disulfonate;
bis(2,2,6,6-tetramethyl-4-piperidyl)phenylphosphite;
tris(2,2,6,6-tetramethyl-4-piperidyl)phosphite;
tris(2,2,6,6-tetramethyl-4-piperidyl) phosphate;
6-aza-7,7-dimethyl-9-benzoyloxy-spiro[4,5]decane;
1-aza-2,2-dimethyl-4-benzoyloxy-spiro[5,5]undecane;
1,9-diaza-4-benzoyloxy-2,2,8,8,10,10-hexamethyl-spiro
 [5,5]undecane;
1,9-diaza-4-(cyclohexylcarbamoyloxy)-2,2,8,8,10,10-
 hexamethyl-spiro[5,5]undecane;
bis(2,2,6,6-tetramethyl-4-piperidyl) ether;
tris(2,2,6,6-tetramethyl-4-piperidyl)benzene-1,3,5-
 tricarboxylate; and tris(2,2,6,6-tetramethyl-4-piperidyl)benzene-1,3,4-
 tricarboxylate.

8. A synthetic polymer composition as claimed in claim 1, wherein said polymer is a polyamide having recurring carbonamide groups as integral parts of the main polymer chain.

References Cited
UNITED STATES PATENTS

| | | | |
|---|---|---|---|
| 3,120,540 | 2/1964 | Meltzer et al. | 260—294.3 |
| 3,431,232 | 3/1969 | Murayama et al. | 260—45.8 |
| 3,436,368 | 4/1969 | Murray | 260—45.8 |

DONALD E. CZAJA, Primary Examiner

R. A. WHITE, Assistant Examiner

U.S. Cl. X.R.

260—18 N, 18 TN, 23 H, 45.8 N, 45.85